MULTIPLEX SYSTEM

Filed March 28, 1947 3 Sheets-Sheet 1

INVENTOR.
WILLIAM D. HOUGHTON
BY H. S. Grover
ATTORNEY

INVENTOR.
WILLIAM D. HOUGHTON
BY H. S. Grover
ATTORNEY

Feb. 27, 1951 W. D. HOUGHTON 2,543,737

MULTIPLEX SYSTEM

Filed March 28, 1947 3 Sheets-Sheet 3

INVENTOR.

WILLIAM D. HOUGHTON

BY H. S. Grover

ATTORNEY

Patented Feb. 27, 1951 2,543,737

UNITED STATES PATENT OFFICE 2,543,737

MULTIPLEX SYSTEM

William D. Houghton, Port Jefferson, N. Y., assignor to Radio Corporation of America, a corporation of Delaware Application March 28, 1947, Serial No. 737,901

19 Claims. (Cl. 179—15)

Figure 1:
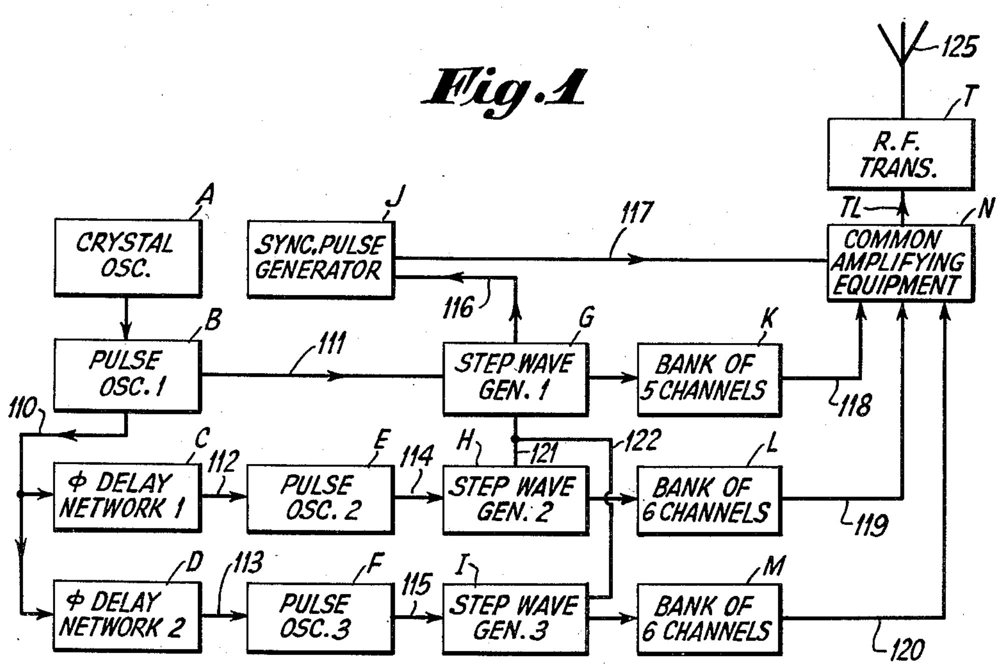

This invention relates to multiplex or multichannel systems operating on the time division principle, sometimes referred to as time division pulse multiplex systems.

In time division multiplex systems there is provided a distributor which sequentially allots a common transmission medium to the different channel units. In systems involving a small number of channels (for example, 5 to 10 channels), the distributor may consist of a simple step voltage wave generator to which the grids of all channel selector tubes are connected in parallel. The output from the step voltage wave generator appears as a series of increasing steps or risers of voltage. The different channel selectors are differently biased to permit anode current flow to start on different steps or risers of the applied step voltage wave. The voltage increment for each riser in the step wave starts the time interval allotted to one channel during which time the channel may produce a modulated pulse. Each channel is allotted a time interval slightly shorter than the interval between succeeding step risers on the step voltage wave. In such a system, the maximum number of channels is determined by the number of steps or risers in the step wave generator output. A multiplex system of the type described above is described in detail in my copending application, Serial No. 608,957, filed August 4, 1945, now U. S. Patent 2,531,817, issued November 28, 1950, to which reference is herein made. Reference is also made to U. S. Patent 2,413,440, granted December 31, 1946, to J. F. Farrington and to my U. S. Patent 2,480,137 for disclosures of systems utilizing a step wave generator for controlling different channels on different step risers of the step voltage wave.

When a very large number of channels is desired, a single step voltage wave generator is not very practical since the voltage differential per step or riser in the step voltage wave becomes too small with reasonable values of supply voltage for the step wave generator. To overcome this difficulty, I propose in the present invention to use in a multiplex time division system several step voltage wave generators so arranged that the outputs from the different step wave generators are coupled to different groups of channels.

An object of my invention is to provide a simple method of generating large numbers of equal time intervals for use in time division multiplex systems.

Another object of the invention is to so design a multiplex system that groups or banks of channels may be inserted or taken out of the system, in accordance with installation requirements, in a simple and quick manner without interfering with the operation of the other channels.

An advantage of the system of the invention involving multiple step voltage waves is that the number of synchronizing pulses per frame is kept at a minimum in order to obtain the maximum time possible for the intelligence carrying channel pulses. Another advantage of the invention lies in the fact that a master oscillator is employed whose frequency is maintained at a low value as a result of which the system permits the use of one synchronizing pulse per frame or sampling cycle. Another advantage of the invention resides in the fact that it provides a means for generating multiple step voltage waves which may be used either in transmitting or receiving multiplex equipment, and preferably in both.

A very brief description of the operation of the multiplex system of the invention follows: A master pulse oscillator whose frequency is equal to $f_0/f_g$, where $f_0$ is the maximum repetition rate of the combined channel pulses and $f_g$ is the number of step voltage waves, is used to feed a number of delay circuits. The number of delay circuits is made one less than the number of step voltage wave generators. The output from each delay circuit is used to produce a short pulse which drives an associated step voltage wave generator individual thereto. The pulses from the master oscillator are also coupled to a step voltage wave generator which fires or discharges itself after the desired number of steps or risers, and at the same time discharges all other step voltage wave generators. The output from each step voltage wave generator is coupled to a group of channels. A cathode output amplifier may be used to couple the step voltage wave generator to its associated group of channels. At the time of the discharge of all step wave generators, a synchronizing pulse is generated which occupies the time interval between the discharge and the next following step riser. In this system it is necessary to send only one synchronizing pulse per frame.

Figure 2:
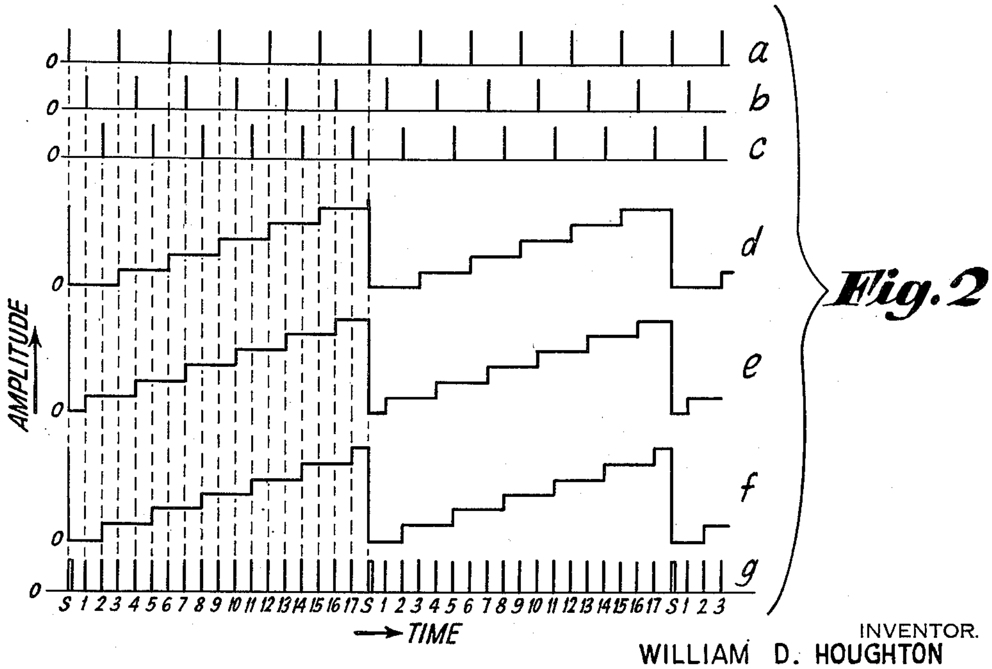
Figure 3:
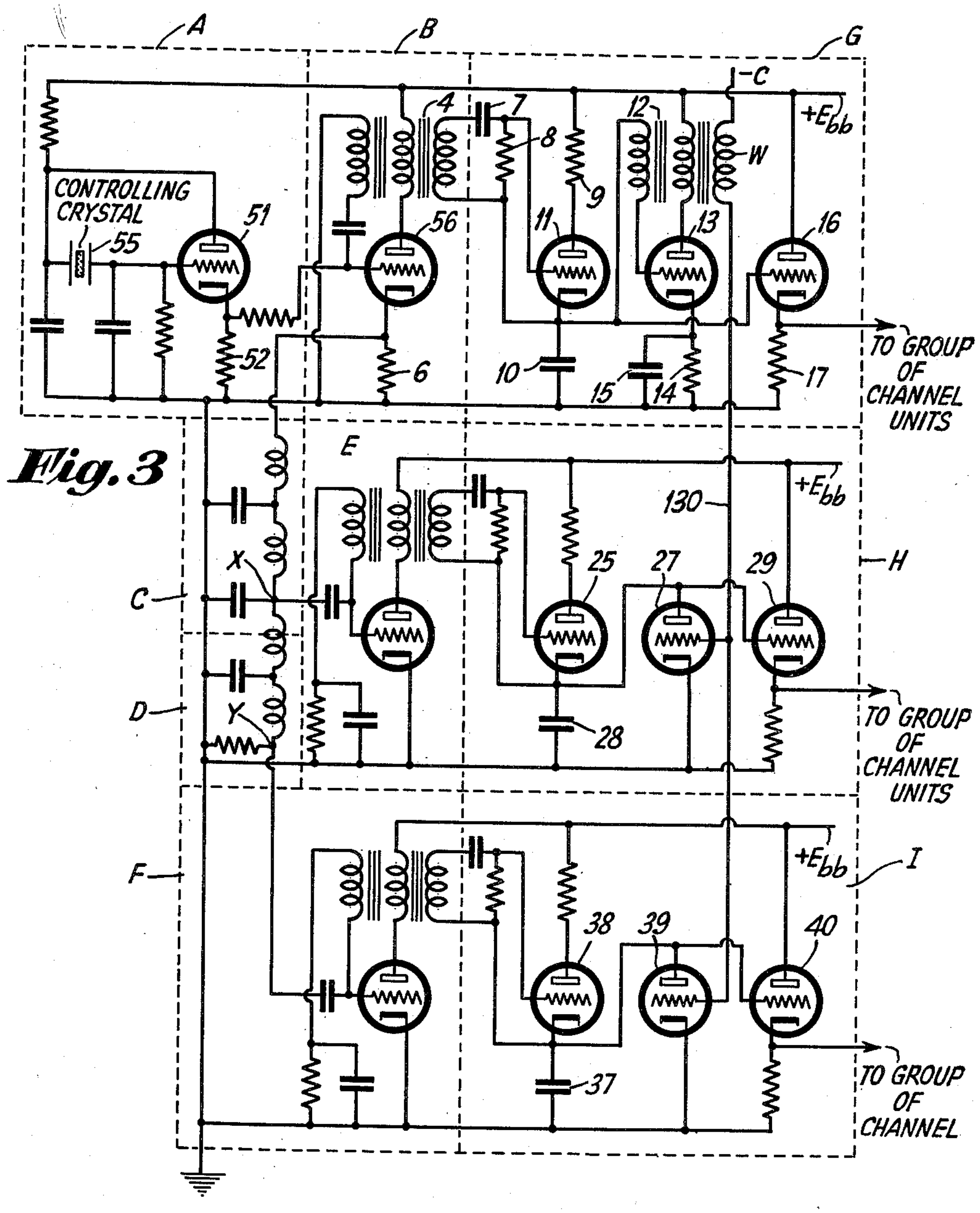
Figure 4:
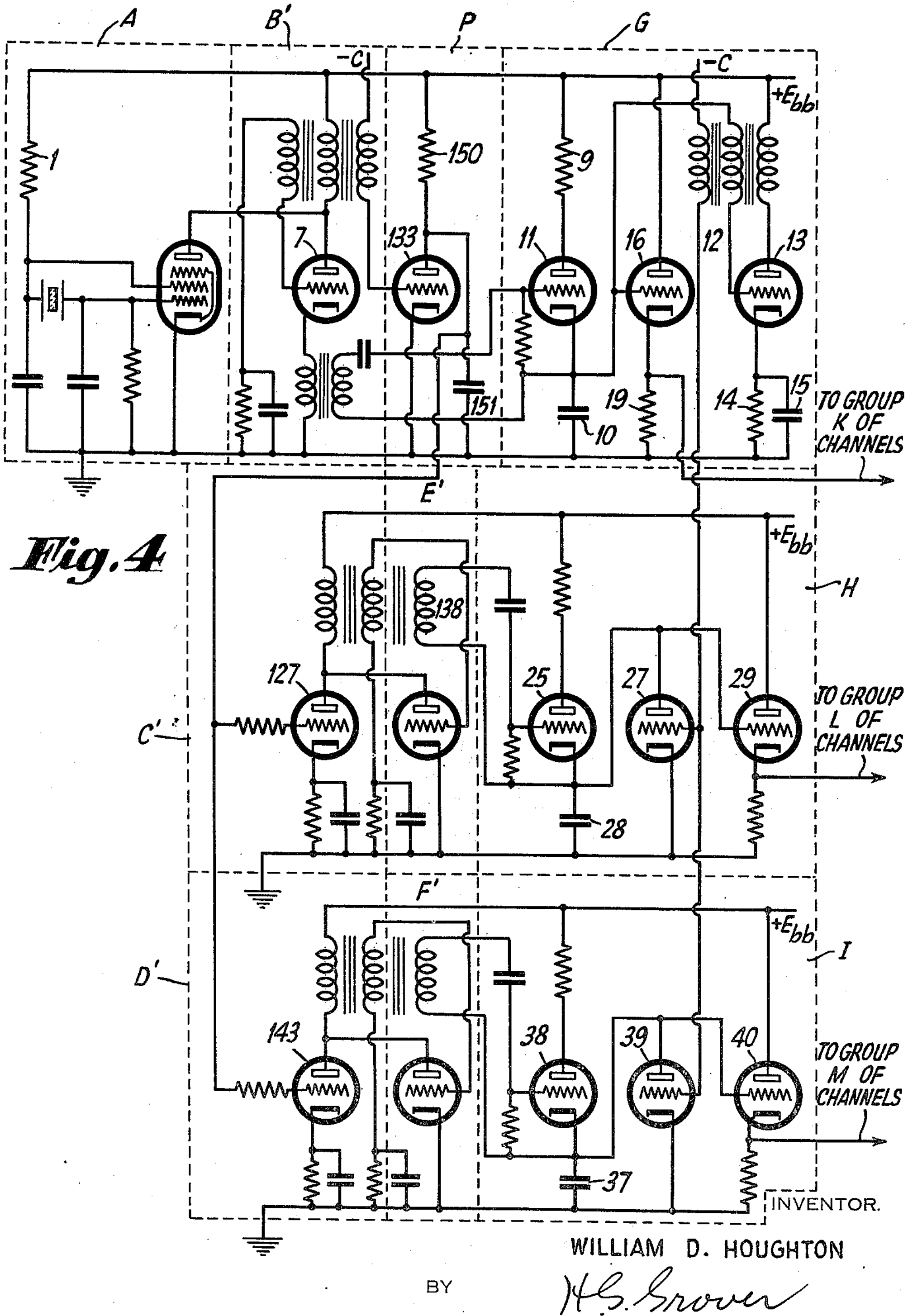

A more detailed description of the invention follows in conjunction with a drawing: wherein;

Fig. 1 diagrammatically illustrates, in box form, a multiplex system operating on the time division principle in accordance with the principles of the present invention;

Fig. 2 is a series of curves or voltage wave forms given to explain the operation of the invention;

Fig. 3 schematically illustrates details of some of the circuits shown in the boxes of Fig. 1;

Fig. 4 is a modification of the system of Fig. 3,

Referring to Fig. 1 in more detail, this figure shows transmitting equipment for 17 channels in accordance with the invention. The number of channels has been selected as 17 merely for purpose of explanation, and it should be understood that any larger number of channels up to 100 channels more or less, can be used. A crystal oscillator A is employed to lock in a master pulse oscillator B. The output from pulse oscillator B is coupled through lead 110 to two phase delaying networks C and D and also through lead 111 to step voltage wave generator G. The output from delay network C is used to drive a tripping pulse oscillator E over lead 112, and the output from delay network D is used to drive a tripping pulse oscillator F over lead 113. Phase delay networks C and D are shown as artificial lines of the lumped constant type. The output pulses from pulse oscillators E and F are coupled to separate step voltage wave generators H and I respectively, through leads 114 and 115. The step voltage wave from generator G is coupled to a group or bank K of 5 channels, while the outputs from the step wave generators H and I are coupled to two groups or banks L and M of six channels each. A synchronizing pulse generator J which produces a synchronizing pulse occurring immediately after the discharge of the step wave generators G, H and I, is controlled by the step wave generator G over lead 116. The combined channel pulses plus the synchronizing pulse are coupled to the common amplifying equipment N which combines the synchronizing pulse and the output pulses from the channel banks and amplifies the pulse train in preparation for modulating a radio frequency transmitter T. The synchronizing pulse generator J is coupled to the amplifier equipment N through lead 117, while the groups of channels K, L and M are individually coupled to this same amplifying equipment over leads 118, 119, and 120.

The crystal oscillator A produces a sine wave output whose positive or negative portion controls the production of a pulse from the pulse generator B. The oscillator A may be any LC or an RS type depending upon stability requirements of the system. The pulse generators B, E and F may be identical in circuit design and may be blocking type pulse oscillators which produce identical D.-C. pulses at the same repetition rate and at the frequency of the crystal oscillator A. The time constants of the pulse oscillators B, E and F are so chosen that their natural frequency of operation is slightly lower than the frequency of crystal oscillator A. Due to the time delays of networks C and D, the pulses produced by pulse oscillators B, E and F occur sequentially and do not overlap. The time delay of network D is greater than the time delay of network C.

When pulse oscillator B fires or produces a pulse, a pulse is sent out simultaneously over leads 110 and 111. The pulse on lead 111 will produce a voltage rise in the step wave output from generator G. The pulse on lead 110 will cause pulse oscillators E and F to produce pulses which result in rises in the voltage in the step wave outputs from generators H and I, but at different occurrence times which are a function of the time delays of networks C and D.

The pulse oscillators B, E and F are in effect, wave shapers to assure identically shaped pulses being applied to generators G, H and I. If the networks C and D do not unduly distort the waveform of the pulses passed therethrough, then pulse oscillators E and F can be omitted.

When the peak or total amplitude of the step voltage wave produced by step wave generator G exceeds a predetermined value, it causes a discharge of the generator G and, by virtue of connections 121 and 122, also causes a discharge of step wave generators H and I.

The individual channels in each group or bank K, L and M have channel selectors which are differently biased to become selectively effective or operative on different voltage steps or risers of the step voltage wave produced by the associated step wave generator G, H or I respectively. All channel selectors in any one bank or group have their input electrodes fed in electrically parallel relationship by the step voltage wave applied thereto. The channel selectors may be of the type described in my copending application, Serial No. 608,957, now U. S. Patent 2,531,817. Each channel in a group or bank has a modulation circuit individual thereto. All of the pulse outputs from a group or bank K, L or M are combined and fed to the common output lead 118, 119 or 120.

The pulses in the output of amplifying equipment N are fed over a line TL for frequency modulating or keying a suitable radio frequency oscillator T, such as a Klystron, or a magnetron. The resultant modulated signal in the output of oscillator T is fed to an antenna or wave directive structure 125.

Referring to Fig. 2, curves or waveforms *a*, *b* and *c* graphically represent sequentially occurring pulses produced by pulse oscillators B, E and F, respectively. The voltage wave forms shown in curves *d*, *e* and *f* of Fig. 2 represent the step voltage waveforms produced by step wave generators G. H and I, respectively. The pulses shown in curve *g* of Fig. 2 represent the combined pulses in succeeding frames as they appear in the output of the common amplifying equipment N. The synchronizing pulse in curve *g* is identified by the letter S, while the channel pulses are represented by the numerals 1 to 17, for the assumed case of 17 channels. It should be noted that the synchronizing pulse S is shown wider than any of the intelligence carrying channel pulses. These pulses from the output of amplifying equipment N may be either time or amplitude modulated, depending upon the type of circuits employed in the individual channels in groups or banks K, L and M, or a combination of both types of modulation may be used simultaneously, if desired.

Fig. 3 shows, schematically, the essential details of the apparatus of the invention which may be employed in Fig. 1. The dashed line boxes in Fig. 3 respectively include the equipment indicated by those in Fig. 1 which have the same reference characters.

Referring to Fig. 3 in more detail, the pulse oscillator B is a conventional transformer feedback blocking oscillator whose normal frequency is slightly lower than the frequency of the controlling oscillator A. The crystal oscillator vacuum tube 51 is a triode type tube having a controlling crystal 55, and provided with a resistor 52 in its cathode circuit. A positive pulse is developed across this resistor when the sine wave on the grid of 51 reaches its maximum positive value. The cathode resistor 52 also forms part of the grid leak resistors in the grid circuit of the pulse oscillator tube. The positive pulse trips the pulse oscillator B at the crystal frequency. Pulses of positive polarity are developed across cathode resistor 6 in the pulse oscillator B, and these pulses are coupled to the two delay lines C and D as shown. Delay line D is terminated by a resistor whose value is equal to the surge impedance of the line, to thereby prevent reflection of waves traveling down the line. Although two delay lines only are shown, this number of delay lines will provide satisfactory operation with a number of channels up to 30, but for more than 30 channels more delay lines should be used.

The pulses from delay line C are taken off from point X and are used to trip a pulse oscillator E, while the pulses from the end of the delay line D are taken off point Y and are used to trip pulse oscillator F. The pulse oscillators E, F and B are identical in construction, as a result of which there are produced three sets of identical pulses in the manner shown by curves *a*, *b* and *c* of Fig. 2. It should be noted from an inspection of Fig. 2 that a pulse from pulse oscillator B is followed by a pulse from pulse oscillator E which is spaced in time by one-third the time period between adjacent pulses from pulse oscillator B. Similarly, a pulse from pulse oscillator E is followed by a pulse from pulse oscillator F which is spaced in time by one-third the time period between adjacent pulses from B.

The pulses from pulse oscillator B drive the step voltage wave generator G. The operation of pulse generator G may be summed up as follows: Vacuum tube 11 is biased to be normally non-conducting due to the grid leak bias developed across resistor 8. Each positive pulse from pulse oscillator B overcomes the bias on tube 11 and causes it to become conducting for the duration of this pulse, during which time a charge is stored in condenser 10 resulting in a rise in voltage on this condenser. After the end of the pulse from oscillator B, current ceases to flow in tube 11 and, since no resistance is present across condenser 10 the potential previously developed on this condenser remains thereon. Upon the occurrence of the next pulse from pulse oscillator B, the condenser 10 is charged to a higher potential. This action continues to build up increments of increasing potential on condenser 10 until the total potential across condenser 10 exceeds the bias on tripping oscillator vacuum tube 13. The amount of incremental charge stored in condenser 10 for each pulse from oscillator B is a function of the duration of the pulse from oscillator B, the anode-cathode impedance of tube 11 and the values of anode resistor 9 and condenser 10. The values of resistor 9 and condenser 10 are chosen so that there is obtained a desired amplitude of step riser across condenser 10 for each pulse from oscillator B. Tripping oscillator vacuum tube 13 is biased by means of a cathode resistor 14 and a bypass condenser 15. The transformer 12 has its windings so poled that when tube 13 starts to carry current, the voltage on the grid of tube 13 is increased, resulting in an increased current. This action continues until condenser 10 is discharged by the grid current from tube 13 at which time tube 13 ceases to conduct and another step wave voltage starts. The step wave voltage developed across condenser 10 appears as shown in curve *d* of Fig. 2, and is coupled to a group K of 5-channel units by means of cathode output amplifier 16. Amplifier 16 is here used as a cathode follower tube and permits the passage therethrough of the step wave voltage as it is built up on condenser 10. Resistor 17 in the cathode circuit of tube 16 is a ground return element.

The pulses from pulse oscillator E are coupled to a normally non-conducting vacuum tube 25 in step wave generator H, and the pulses from pulse oscillator F are coupled to normally non-conductive vacuum tube 38 in step wave generator I. Tubes 25 and 38 operate in a manner similar to that described for vacuum tube 11 of step wave generator G. Tube 25 charges condenser 28, while tube 38 charges condenser 37, when these tubes become conductive. The anode of a normally non-conducting vacuum tube 27 is connected to the cathode end of condenser 28, and a similar vacuum tube 39 has its anode coupled to the cathode end of condenser 37. The grids of tubes 39 and 27 are coupled via lead 130 to one end of winding W of transformer 12. A negative D.-C. potential represented by the symbol —C is connected to the other end of the winding W and is of sufficient magnitude to maintain tubes 27 and 39 in the anode current cut-off condition. Other types of bias such as grid leak or cathode bias may be applied to tubes 27 and 39 to replace the —C voltage, if desired. The winding W of transformer 12 is so poled that when tube 13 fires (conducts), a positive pulse is developed on the grids of tubes 27 and 39, causing these tubes to conduct and discharge condensers 28 and 37 respectively.

The action of the system with time then is as follows: Pulse oscillator B fires, causing a step of voltage to be developed across condenser 10 of generator G and also starting a pulse on delay line C. When the pulse traveling along delay line C reaches point X, pulse oscillator E fires, causing a step of voltage to be developed across condenser 28 of step wave generator H. The pulse on the delay line C continues to travel to delay line D, and when this pulse reaches the end of delay line D represented by point Y, pulse oscillator F fires, causing a step of voltage to be developed across condenser 37 of step wave generator I. The time required for the pulse to travel from pulse oscillator B to point X is equal to one-third the time period between successive pulses from oscillator B; and the time required for the pulse to travel from point X to point Y at the end of the delay line D is also one-third the period between successive pulses from pulse oscillator B. On the next pulse from pulse oscillator B, condenser 10 receives another charge, resulting in a step of voltage being stored thereon. The previously described action continues until tube 13 fires, at which time condensers 10, 28 and 37 are discharged and a new step voltage wave cycle is started.

It should be noted that the particular pulse from oscillator B which caused the discharge of the step wave generators G, H and I continues to travel down the delay line C after this discharge and reaches point X at a time after the discharge which is equal to one-third the period of oscillator B. This pulse at point X trips pulse oscillator E and produces the first incremental charge in condenser 28 of step voltage wave generator H in the new step wave cycle. The pulse on delay line C continues to travel down line D and reaches point Y to trip pulse oscillator F and produces the first incremental charge in condenser 37 of step voltage wave generator I in the new step wave cycle for this generator. After the pulse reaches point Y, and at a time interval equal to one-third the period of oscillator B, the oscillator B again fires, resulting in the first incremental charge in condenser 10 of step voltage wave generator G in the new step wave cycle for this generator.

The step voltage waveforms from generators G, H and I appear as seen in curves *d*, *e* and *f* respectively of Fig. 2, and are taken off the cathodes of cathode followers 16, 29 and 40 respectively.

The individual channel circuits of groups or banks K, L and M have not been shown but these may take the form of the circuits shown in my copending application Serial No. 608,957, now U. S. Patent 2,531,817, referred to above. Each channel circuit may include the following apparatus; a position or channel selector, a saw-tooth generator, a pulse generator and a pulse position modulator for varying the position of the pulse generated by the pulse generator in accordance with the amplitude of the modulating signal for that channel. The channel selectors are also shown in U. S. Patent 2,469,066, granted May 3, 1949, to J. R. Day. The different channel selectors in any one bank or group are normally non-conductive vacuum tubes which are differently biased to become conductive on different steps or risers of the step voltage wave applied to the inputs of the channel selectors in parallel. Instead of a pulse position modulator, each channel circuit may have an amplitude modulator for modulating the amplitude or a pulse with modulator for modulating the length or duration of the pulse generated in the channel.

It should be further noted that although there are six risers in each of the step voltage wave outputs from generators G, H and I, as seen from an inspection of voltage wave forms *d*, *e*, and *f*, Fig. 2, there are only five risers allotted to five channels in curve *d* whereas there are six risers allotted to six channels in each of curves *e* and *f*. The sixth riser in curve *d* starts the discharge action for all step wave generators. Each channel is allotted a time interval equal to one-third the period of the pulses from B. In present practice, if the system is used with pulse position modulation there will be a guard space between channels as described in my copending application, now U. S. Patent 2,531,817, hereinbefore referred to, and the resultant output from the common amplifier equipment N will be used to key "on" and "off" the radio transmitter T. If pulse amplitude modulation is employed, then there should be allotted sufficient space between pulses from adjacent channels to prevent undesired cross-modulation, and the resultant output pulses from the amplifier N can be used to frequency modulate the radio frequency transmitter T. The output from radio frequency transmitter T, in this last case, may be a single frequency modulated carrier wave, or a doubly frequency modulated carrier wave if a subcarrier is first frequency modulated and used to frequency modulate a higher frequency carrier.

The synchronizing pulse may be generated by the discharge pulse from the step wave generator G in a manner similar to that shown in my copending application Serial No. 608,957, now U. S. Patent 2,531,817. This discharge pulse causes a normally conducting vacuum tube, called the synchronizing pulse generator J to cut-off for a predetermined interval of time greater than the time duration of a channel pulse. This synchronizing pulse occurs immediately after the discharge of the step wave generators and before the next channel pulse, as will be seen from an inspection of curve *g*, Fig. 2, in which the channel pulse is labeled S. Of course two pulses more closely spaced than any adjacent channel pulses may be used, if desired, as synchronizing pulses, or the synchronizing pulse may have an amplitude higher than that reached by any channel pulse on the extremes of modulation. If desired, the synchronizing pulse generator may comprise any suitable vacuum tube circuit well known in the multiplex or television arts for producing a pulse of fixed width of Fig. 2. As an illustration of the manner in which both synchronizing and channel pulses are generated and combined in a common amplifying equipment in a pulse multiplex system, reference is made to U. S. Patent 2,403,210, granted July 2, 1946, to Butement et al.

The common amplifier equipment N may take any suitable form, such as illustrated and described in my copending application Serial No. 608,957, now U. S. Patent 2,513,817 referred to above.

Fig. 4 shows a modification or alternate circuit which may be used instead of the circuit of Fig. 3. The same reference characters represent the same parts throughout both Figs. 3 and 4, while equivalent parts have been given prime designations in Fig. 4. In Fig. 4, the crystal oscillator is shown as A and the output of this crystal oscillator locks in the pulse oscillator B′ at the frequency of the crystal oscillator. The output of the pulse oscillator B′ is used to control a saw-tooth voltage generator P which generates a saw-tooth voltage wave whose linear rise time is equal to the time between adjacent pulses from pulse oscillator B′. Phase delay networks C′ and D′ replace the delay lines C and D of Fig. 3. The saw-tooth generator P comprises a vacuum tube 133 which is normally non-conducting and a resistor 150 and a condenser 151 in its anode circuit. The application of a pulse from pulse oscillator B′ will cause tube 133 to conduct and discharge the condenser 151 which had charged linearly during the non-conductive period of tube 133 corresponding to the period between pulses from B′. Phase delay networks C′ and D′ each comprise a normally non-conductive vacuum tube 127 and 143 respectively. Pulse generators E′ and F′ of Fig. 4 are identical with pulse generators E and F of Fig. 3 except that they are driven from their anode circuits instead of their grid circuits, as shown. Tube 127 of this delay network C′ is so biased that it becomes conducting at one-third the amplitude of the applied saw-tooth voltage wave from saw-tooth generator P. When tube 127 becomes conducting, a current change takes place in transformer 138 of pulse generator F′, causing pulse oscillator E′ to fire. Hence a pulse is generated by pulse oscillator E′ at a time equal to one-third the time period of pulse oscillator B′ after pulse oscillator B′ fires. Tube 143 of phase delay network D′ is similar to 127 of network C′ with the exception that it is biased to become conducting at a time equal to two-thirds the time period of pulse oscillator B′ after B′ fires. Tube 11 of step wave generator G of Fig. 4 is driven by means of a transformer in the cathode circuit of tube 7 of the pulse oscillator B′ instead of from the transformer in the anode circuit of pulse oscillator B as shown in Fig. 3. Except for the foregoing, the system of Fig. 4 operates in a manner similar to that described for Fig. 3.

The present invention provides a simple means of generating the large numbers of timing intervals for use in a time division multiplex system. The frequency of the master oscillator may be kept at a low value thus permitting the use of one synchronizing pulse per frame or sampling cycle. An important feature of the invention is that different groups or banks of channels may be built as units which can be added to the system or taken out from the system according to installation requirements, in a quick and simple manner.

It should be understood of course that an additional step wave generator identical with H and I can be included in the circuit of Fig. 3 and used in similar manner, with an additional section of delay network at the bottom of network D feeding this additional step wave generator. Another counter circuit could then be used only to discharge all the step wave generators.

What is claimed is:

1. In a multi-channel communication system wherein a common transmission medium is sequentially assigned to the different channels, a source of controlling repetitive waves, a plurality of step voltage wave generators, circuits having different phase delays coupling said source to said generators, each of said generators producing a step voltage wave having a plurality of risers of different voltage values, said phase delays being so related as to cause the risers in the step voltage wave produced by one generator to be interlaced with the risers in the step voltage wave produced by another of said generators.

2. In a multi-channel communication system wherein a common transmission medium is sequentially assigned to the different channels, a source of controlling repetitive waves, a plurality of step voltage wave generators, circuits having different phase delays coupling said source to said generators, each of said generators producing a step voltage wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, and means in circuit with all of said step wave generators and responsive to a predetermined voltage value developed by one of said step wave generators for discharging all of said step wave generators.

3. In a multi-channel communication system wherein a common transmission medium is sequentially assigned to the different channels, a source of controlling repetitive waves, a plurality of step voltage wave generators, circuits having different phase delays coupling said source to said generators, each of said generators producing a step voltage wave having a plurality of risers of different voltage values each step or riser in the voltage wave produced by any one generator occurring in the interval between adjacent steps or risers of the voltage waves produced by the other generators, whereby said steps or risers in all of said voltage waves are interlaced, one of said step wave generators including a normally non-conductive pulse oscillator responsive to a predetermined voltage developed by said one step wave generator for discharging the same, and connections from said pulse oscillator to the other step wave generators for discharging said other generators when said pulse oscillator produces a pulse.

4. A multi-channel communication system comprising a first pulse oscillator, a second pulse oscillator, a phase delay circuit coupling the output of said first oscillator to the input of said second oscillator, whereby said first oscillator exercises control over said second oscillator through said delay circuit, separate step voltage wave generators individually coupled to and under control of said pulse oscillators, each of said step voltage wave generators producing a wave having a plurality of risers of different voltage values, each incremental change in voltage produced in one step wave generator occurring in the interval between adjacent incremental changes in voltage produced in the other step wave generators whereby said incremental changes in all of said step voltage waves are interlaced.

5. A multi-channel communication system comprising a first pulse oscillator, a second pulse oscillator, a phase delay circuit, means controlling said second oscillator from said first oscillator through said delay circuit, said pulse oscillators being so constructed and arranged as to produce pulses of substantially identical characteristics, separate step voltage wave generators individually coupled to and under control of said pulse oscillators, each of said step voltage wave generators producing a wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced.

6. A multi-channel communication system comprising a first pulse oscillator, a second pulse oscillator, a phase delay circuit, means controlling said second oscillator from said first oscillator through said delay circuit, separate step voltage wave generators respectively coupled to and under control of said pulse oscillators, each of said step voltage wave generators producing a wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, a group of channel circuits having their inputs coupled in electrically parallel relation to one of said step voltage wave generators, another group of channel circuits having their inputs coupled in electrically parallel relation to the other step voltage wave generator, means in circuit with the channel circuits in each group for differently biasing the channel circuits to become effective on different risers of the step voltage wave applied to said group.

7. In a multi-channel communication system wherein a common transmission medium is sequentially assigned to the different channels, a source of controlling repetitive waves, a plurality of step voltage wave generators, circuits having different phase delays coupling said source to said generators, each of said generators producing a step voltage wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, and means in circuit with all of said step wave generators and responsive to a predetermined voltage value developed by one of said step wave generators for discharging all of said step wave generators, a group of channel circuits having their inputs coupled in electrically parallel relation to one of said step voltage wave generators, another group of channel circuits having their inputs coupled in electrically parallel relation to the other step voltage wave generator, and means in circuit with the channel circuits in each group for differently biasing the channel circuits to become effective on different risers of the step voltage wave applied to said group.

8. The method of operating a multi-channel communication system which includes, producing a plurality of step voltage waves each having a plurality of risers of different voltage values, phase displacing said step waves such that any one riser in one wave occurs at a time interval between an adjacent pair of risers in another step wave, whereby the risers in the different step waves are interlaced, and controlling different channel circuits from the different risers.

9. The method of operating a multi-channel communication system which includes, producing a plurality of step voltage waves each having a plurality of risers of different voltage values, phase displacing said step waves such that any one riser in one wave occurs at a time interval between an adjacent pair of risers in another step wave, whereby the risers in the different step waves are interlaced, causing the different phase displaced risers to produce different phase displaced pulses, and controlling a radio frequency wave from said pulses.

10. The method of operating a multi-channel communication system which includes, producing a plurality of step voltage waves each having a plurality of risers of different voltage values, phase displacing said step waves such that any one riser in one wave occurs at a time interval between adjacent risers in another step wave, whereby the risers in the different step waves are interlaced, utilizing the different phase displaced risers to produce different correspondingly positioned amplitude modulated pulses, feeding said pulses to a common radio frequency oscillator, and modulating the frequency of said oscillator by said pulses.

11. A multi-channel communication system comprising a first pulse oscillator, a second pulse oscillator, a phase delay circuit, means controlling said second oscillator from said first oscillator through said delay circuit, individual step voltage wave generators coupled to and under control of said pulse oscillators, each of said step voltage wave generators producing a wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, a group of channel circuits having their inputs coupled in electrically parallel relation to one of said step voltage wave generators, another group of channel circuits having their inputs coupled in electrically parallel relation to the other step voltage wave generator, and means in circuit with the channel circuits in each group for differently biasing the channel circuits to become effective on different risers of the step voltage wave applied to said group.

12. A multi-channel communication system comprising a first pulse oscillator, a second pulse oscillator, a phase delay circuit, means controlling said second oscillator from said first oscillator through said delay circuit, separate step voltage wave generators respectively coupled to and under control of said pulse oscillators, each of said step voltage wave generators producing a wave having a plurality of risers of different voltage values, the risers in the different step voltage waves being phase displaced in dependence upon the constants of said delay circuit, each step or riser in the voltage wave produced by any one generator occurring in the interval between adjacent steps or risers of the voltage waves produced by the other generators, whereby said steps or risers in all of said voltage waves are interlaced, means in circuit with all of said step wave generators and responsive to a predetermined voltage value developed by one step wave generator for simultaneously terminating the step voltage waves of all step wave generators, a synchronizing pulse generator controlled by said means to produce a pulse upon the termination of said step waves and in the interval between step voltage waves, a plurality of channel circuits coupled to each of said step voltage wave generators and biased to become responsive to different risers on the step voltage waves to produce different phase displaced pulses, and common amplifying equipment coupled to the outputs of said channel circuits and to said synchronizing pulse generator.

13. A multi-channel transmitting system comprising a source of pulses of constant repetition rate, a delay network, a pair of pulse oscillators coupled to different points on said delay network, means coupling said source to said network, whereby said source controls said pulse oscillators through said delay network, the arrangement of said delay network being such that one pulse oscillator is controlled by said source before the other pulse oscillator, a step voltage wave generator coupled to and controlled by each pulse oscillator, each generator producing a step voltage wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, means in circuit with both step wave generators and responsive to a predetermined voltage value developed by one step wave generator for simultaneously terminating the step voltage waves produced by both step wave generators, a group of channel circuits coupled to each step wave generator and biased to become responsive to different risers in the step voltage wave applied thereto for producing phase displaced pulses, said means being utilized to produce a synchronizing pulse, and a common output circuit for all of said channels and for said synchronizing pulse.

14. In a multi-channel communication system wherein a common transmission medium is sequentially assigned to the different channels, a source of controlling repetitive waves, a plurality of step voltage wave generators, circuits having different phase delays individually coupling said source to said generators, said circuits comprising artificial lines of the lumped constant type, each of said generators producing a step voltage wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced, and means responsive to a predetermined voltage value developed by one of said step wave generators for discharging all of said step wave generators.

15. In a multi-channel communication system wherein a common transmission medium is sequentially assigned to the different channels, a source of controlling repetitive waves, a plurality of step voltage wave generators, means individually coupling said generators to said source and assuring different phase delays in the operation of said generators, said means including a saw-tooth voltage generator and a normally non-conductive tube between said saw-tooth generator and each one of said respective generators, and means in circuit with said normally non-conductive tubes for biasing said tubes to become conducting on different portions of the rise of the saw-tooth voltage wave, each of said generators producing a step voltage wave having a plurality of risers of different voltage values, each step or riser in the voltage wave produced by any one generator occurring in the interval between adjacent steps or risers of the voltage waves produced by the other generators, whereby said steps or risers in all of said voltage waves are interlaced.

16. The method of operating a communication system which includes producing a substantially constant frequency repetitive waveform, producing a pulse under control of each cycle of said repetitive waveform, producing saw-tooth voltage waves under control of said pulses, and producing under control of said saw-tooth voltage waves a step voltage wave having a plurality of risers each of which represents one cycle of voltage produced by a saw-tooth voltage wave.

17. The method of operating a multi-channel communication system which includes, producing a plurality of time displaced step voltage waves each of which has a plurality of risers of different voltage values, the time displacement being such that any one riser in one step wave occurs at a time interval between a pair of adjacent risers in another step wave, whereby the risers in the step waves are interlaced, and producing from the different risers single polarity time displaced pulses in the channel circuits, applying different modulating signals to the different channel circuits, thereby producing a series of pulses each bearing a different modulation for each cycle of operations.

18. A method of operating a multi-channel communication system which includes, producing a plurality of phase displaced and interlaced step voltage waves each of which has a plurality of risers of different voltage values, the phase displacement being such that any one riser in one step wave occurs at a time different from and between the risers in another step wave, controlling different channel circuits from the different risers in the different step voltage waves, producing pulses in said channel circuits, and respectively modulating the pulses produced in different channel circuits by different intelligence waves.

19. In combination, a plurality of generators producing step voltage waves each wave having a plurality of risers, means for applying controlling repetitive waves to said generators through circuits having different phase delays, said phase delays being so related as to cause the risers in the step voltage wave produced by one generator to be interlaced with the risers in the step voltage wave produced by another of said generators.

WILLIAM D. HOUGHTON.

REFERENCES CITED

The following references are of record in the file of this patent:

UNITED STATES PATENTS

| Number | Name | Date |
|---|---|---|
| 2,113,011 | White | Apr. 5, 1938 |
| 2,199,634 | Koch | May 7, 1940 |
| 2,405,231 | Newhouse | Aug. 6, 1946 |
| 2,405,239 | Seeley | Aug. 6, 1946 |
| 2,413,440 | Farrington | Dec. 31, 1946 |
| 2,429,631 | Labin | Oct. 28, 1947 |
| 2,468,059 | Grieg | Apr. 26, 1949 |
| 2,500,863 | Posthumus | Mar. 14, 1950 |